(12) United States Patent
Moondra et al.

(10) Patent No.: US 10,334,051 B1
(45) Date of Patent: Jun. 25, 2019

(54) SYSTEM FOR COLLECTING AND SECURELY EXCHANGING WIRELESS DATA AMONG A MARKETPLACE OF USERS

(71) Applicants: Neeraj Moondra, Oakton, VA (US); Darren Koenig, Mt. Vernon, NY (US); Darrin Wilkey, Bountiful, UT (US)

(72) Inventors: Neeraj Moondra, Oakton, VA (US); Darren Koenig, Mt. Vernon, NY (US); Darrin Wilkey, Bountiful, UT (US)

(73) Assignee: DND Partners LLC, Bountiful, UT (US)

(*) Notice: Subject to any disclaimer, the term of this patent is extended or adjusted under 35 U.S.C. 154(b) by 285 days.

(21) Appl. No.: 15/483,897

(22) Filed: Apr. 10, 2017

Related U.S. Application Data

(60) Provisional application No. 62/320,750, filed on Apr. 11, 2016.

(51) Int. Cl.
| | | |
|---|---|---|
| *G06F 15/16* | (2006.01) | |
| *H04L 29/08* | (2006.01) | |
| *H04W 48/16* | (2009.01) | |
| *H04W 4/80* | (2018.01) | |
| *H04W 84/12* | (2009.01) | |
| *H04L 29/06* | (2006.01) | |

(52) U.S. Cl.
CPC ............ *H04L 67/125* (2013.01); *H04L 67/26* (2013.01); *H04W 4/80* (2018.02); *H04W 48/16* (2013.01); *H04L 67/42* (2013.01); *H04W 84/12* (2013.01)

(58) Field of Classification Search
USPC ....... 709/203, 206, 217, 219, 223, 224, 226, 709/228, 230, 232, 238; 705/7.14, 20; 726/27
See application file for complete search history.

(56) References Cited

U.S. PATENT DOCUMENTS

| | | | | |
|---|---|---|---|---|
| 7,650,376 B1 * | 1/2010 | Blumenau | ........... | H04L 67/1008 709/203 |
| 8,346,594 B2 * | 1/2013 | Begeja | ............... | G06Q 30/0201 705/20 |
| 8,374,901 B2 * | 2/2013 | Vianello | ............ | G06Q 10/1053 705/7.14 |
| 9,021,604 B2 * | 4/2015 | Nicolas | ................. | H04L 63/102 709/224 |
| 9,461,958 B1 * | 10/2016 | Green | .................... | G06F 16/435 |
| 9,930,505 B2 * | 3/2018 | Cheng | .................... | H04W 4/21 |

(Continued)

*Primary Examiner* — Quang N Nguyen
(74) *Attorney, Agent, or Firm* — Frost Brown Todd LLC

(57) ABSTRACT

The present disclosure relates to systems and methods for providing access to wireless data to devices that, for any given reason, cannot communicate on long range wireless networks. As described herein, host devices can allow guest devices to pair via a short range wireless system. Host devices can then act like a courier for data that a guest device wishes to send. A broker system can schedule pairing between devices based on how much data a host device is willing to sell and at what price. Examples of guest devices could be sports equipment used to measure analytic sports data. Integrating a complete cellular interface into a ball may be expensive, considering the costs of data plans. It may be cheaper for an integrated Bluetooth chip to intermittently connect to a nearby smartphone and use the smartphone to send data to a user.

17 Claims, 10 Drawing Sheets

(56) References Cited

U.S. PATENT DOCUMENTS

| | | | |
|---|---|---|---|
| 2015/0112773 A1* | 4/2015 | Shahraray | H04W 4/90 709/201 |
| 2016/0191591 A1* | 6/2016 | Rider | H04L 65/00 709/219 |
| 2017/0161765 A1* | 6/2017 | Cheatham, III | G06Q 30/0208 |
| 2017/0161813 A1* | 6/2017 | Cheatham, III | H04W 4/029 |
| 2017/0221081 A1* | 8/2017 | Ollikainen | G06Q 30/0201 |

* cited by examiner

US 10,334,051 B1

SYSTEM FOR COLLECTING AND SECURELY EXCHANGING WIRELESS DATA AMONG A MARKETPLACE OF USERS

CROSS REFERENCE TO RELATED INFORMATION

This application claims the benefit of U.S. Provisional Patent Application No. 62/320,750, filed Apr. 11, 2016, the contents of which are hereby incorporated herein in its entirety.

TECHNICAL FIELD

The present disclosure is directed to the field of telecommunications and more specifically to wirelessly connected devices.

BACKGROUND OF THE INVENTION

There is a desire to connect different types of devices to the internet, or to other devices. While computers and smartphones have long had internet capability, devices such as refrigerators, watches, cars, and others, are beginning to be produced with internet and telecommunications capabilities. While the "internet of things" is desirable, connectivity via cellular data plans or Wi-Fi can be expensive.

BRIEF SUMMARY OF THE INVENTION

One embodiment of the present disclosure comprises a method for connecting a remote device to a remote server, comprising: receiving, from the remote device, a request for wireless data access, the request including a maximum compensation offer; receiving, from a host device, a compensation demand for wireless data access; determining that the maximum compensation offer is greater than or equal to the compensation demand; sending a notification to the host device to allow a communication from the remote device over a short range wireless network; receiving the communication from the host device over a data network; and transmitting the communication to the remote server.

Another possible embodiment of the present disclosure comprises a system for connecting a remote device to a remote server, comprising: a first communication interface operable to receive a request for wireless data access from the remote device, the request including a maximum compensation offer, the first communication interface further operable to receive a compensation demand for wireless data access from a host device, a server operable to determine that the maximum compensation offer is greater than or equal to the compensation demand, the server operable to send a notification to the host device to allow a communication from the remote device over a short range wireless network, the server further operable to receive the communication from the host device over a data network; and a second communication interface operable to transmit the communication to the remote server.

Another possible embodiment under the present disclosure comprises a system for connecting a remote device to a remote server, comprising: a host device operable to communicate over a short range wireless network and a long range wireless network; a marketplace server operable to receive a request for wireless data access from the remote device, the request including a maximum compensation offer, the marketplace server further operable to receive a compensation demand for wireless data access from the host device, the marketplace server further operable to determine that the maximum compensation offer is greater than or equal to the compensation demand, the marketplace server operable to send a notification to the host device to allow a communication from the remote device over the short range wireless network; and a data server operable to receive the communication from the host device over the long range wireless network and to transmit the communication to the remote server.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

With the advent of the Internet, there is a need for a system that enables the many and varied types of devices to transmit information to the Internet; however, connectivity electronics and services are often cost prohibitive and cumbersome. At the same time, there are hundreds of millions of home internet connections accessed via Wi-Fi, and smartphones and connected personal mobile devices with wireless data plans that are underutilized; i.e., subscribers are paying for unused bandwidth. There is no existing platform that allows personal devices to share bandwidth securely with other devices. Systems that are currently in place are governed by wireless carriers in the form of dedicated data plans for machines (M2M) which require a relatively costly wireless modem and usage fees. Moreover, in the past, machines and devices that needed to connect to the Internet/cloud required a dedicated radio/modem activated with a wireless data plan from a wireless network operator (carrier), or a hard wired internet connection from an internet services provider. This adds both hardware and recurring subscription costs to the machine's operator. While this model may have made financial sense for mission critical machines/devices, it is not a viable model for lower cost or lower value devices that need infrequent connectivity or need connectivity only on-demand.

The current disclosure includes embodiments of systems and methods that enable wired or wireless bandwidth on any internet-enabled device (smartphone, tablet, and computer) to be managed for access by other devices thereby increasing utilization of existing data plans on phones/tablets and deriving incremental value for the mobile device subscribers. Other embodiments under the present disclosure provide a means for one-to-one authentication and data transfer between devices (e.g. from a personal fitness tracker to a smartphone) which is limited to few applications and does not enable the "Internet of Everything" at a scale enabled by the system of the invention. Other embodiments include systems and methods for arbitrating and valuating personal data plans, providing an incentive for users to trade personal bandwidth. Embodiments can assist in the seamless management or exchange of bandwidth on personal devices like smartphones and tablets.

Figure 1:
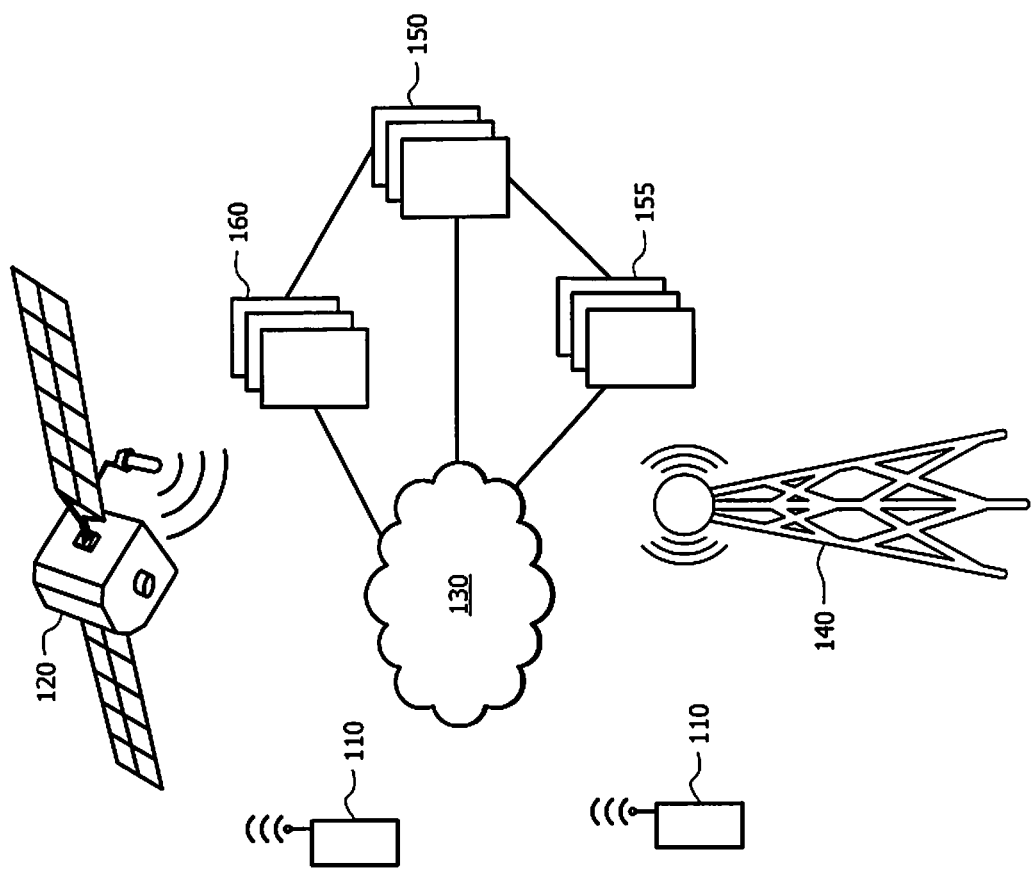
FIG. 1 is a diagram of one possible embodiment of the disclosure.
Figure 1:
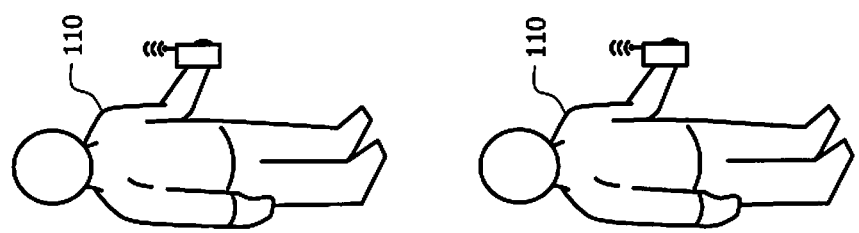
Figure 1:
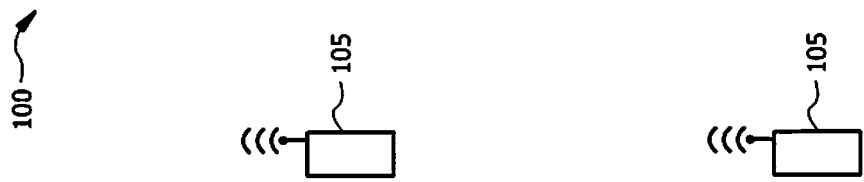

For example, FIG. 1 displays a possible embodiment of a system 100 under the current disclosure. A guest or remote device 105 with a low-cost short range radio (e.g. Bluetooth LE, Wi-Fi, or another appropriate wireless system) is enabled to send data securely using nearby host devices 110 with WAN connectivity (e.g. smartphone with wireless data plan such as cellular, satellite or other). The guest device 105 may interface with the host device 110 using standard or proprietary short range communications protocols. The host 110 serves as a secure courier and will be responsible for providing a connection to the internet/cloud 130 via cellular network 140, or satellite network 120, or other wireless data network. Guest device 105 may be trying to communicate with servers 160 to report its position, a measured value, or some form of data. Data from the guest device 105 may pass through host device 110, then to broker 150, and then directly to remote servers 160. Alternatively, data may flow from the host device 110 directly to remote servers 160. Alternatively, broker 150 may connect to servers 160 directly or may send data to servers 160 via the internet or another network. Broker 150 may manage a population of host devices 110, provide a wireless data marketplace, perform actions like determining location, prices for unused wireless data, amounts of unused wireless data, user registration or identification and more. Application interface 155 may connect directly to servers 150, or to the internet 130, and may provide third party users an interface for developing and integrating third party applications into system 100. Thus, any wireless device enabled and registered on a wireless data marketplace (broker 150) can become a secure "courier" for information from other registered devices that need to transmit data to the internet but do not have or are not using an autonomous connection to the internet themselves. The host 110 would be able to manage and control guest access to a specified quantity of their bandwidth through the marketplace or through applications that have an interface to the marketplace. Once enabled, the marketplace would make the interaction seamless to the hosts and guests. Hosts 110 would typically not, however, have access to the guest's data and would collect the data itself via a short/personal range data transmission such as Bluetooth or Wi-Fi.

The host 110 will benefit from increased utilization of their existing wireless data plans for which they typically pay a monthly fee to wireless operators. In order to unlock incremental value for the bandwidth made available by the host 110, the computer controlled marketplace created by broker 150 can allow exchange of utilized bandwidth for compensation which in turn can be provided by the guest 105 or the broker 150. Broker 150 can provide logic, matchmaking, monetization framework and control for how data is exchanged between host 110 and guest 105. To match a host device 110 and a guest device 105 the broker can compare a price or compensation demand from a host and a compensation or price offer from a guest device. Price and compensation can include any type of reward or remuneration described herein, including money, loyalty points, rewards, credits, digital currency, gift cards, game credits, etc. Users of host devices 110 and guest devices 105 may create compensations offers and requests with varying values for different forms of compensation. Broker 150 can compare compensation offers and demands from guest devices 105 and host devices 110 and match them accordingly. A guest device 105 and host device 110 can be matched if the compensation offer is greater than, or greater than or equal to, a compensation demand. Incentives provided by third parties, or by the broker 150 itself, can be included in a calculation comparing offers and demands. In some embodiments, a user of a guest device 105 may not pay all of the compensation received by a user of a host device. In some embodiments there may be no compensation at all.

Host 110 and guest 105 can both store software and data allowing secure communication between them and with the servers 160, broker 150, or application interface 155. Application interface 155 can allow third party applications to communicate with the broker 150 to define terms for data transport, value of bandwidth, delivery confirmation, and any information required for system 100 to operate. The guest 105 device may interface with the host 110 device using standard or proprietary short range communications protocols. The host 110 can provide bidirectional connectivity to the broker 150. The data packaged and transmitted could be managed by applications residing on the host 110 and/or guest 105 machines. Such applications can communicate with the broker 150 for authentication, permissions, security, delivery confirmation, and mediation, and the broker 150 can further communicate via interfaces with other systems to define the rules and to complete the transactions.

The system 100 can enable a host 110 to capture up to a permissible amount of data during a short period of time and continue to act as a secure courier even when out of range of the guest 105. Host 110 can conduct the data transmission even when it is outside the range of the guest 105. If the data transmission is not completed successfully, the broker 150 can inform guest 105 that the data transmission should be repeated using another new host.

The broker 150 can manage all aspects of valuation and urgency/prioritization of bandwidth for bi-directional data transfers between applications. The broker 150 can allow guest 105 to choose the least cost route or optimal path for data transfers based on rules chosen by a user and saved at servers 160, broker 150, or application interface 155. Users of host devices 110 may register with the marketplace and set appropriate rules for how they would like to allocate their bandwidth for guest devices 105. Users of host devices 110 can also set parameters for what types of guest devices 105 and transactions they will allow. Owners of guest devices 105 can also register with the marketplace and set parameters for how, when and where the guest devices 105 should connect with potential hosts 110 and transmit data. Also, the owners of guest devices 105 may use the marketplace to bid for bandwidth from hosts 110 and determine what the hosts 110 will get in exchange for the bandwidth utilized by the guests 105. If the transaction is completed successfully, the marketplace run by broker 150 will manage the points/rewards associated with the transaction. Interfaces 155 to the marketplace will allow guests 105 and hosts 110 to negotiate the value of the bandwidth. Guests 105 will automatically detect nearby hosts 110. If a host 110 is authorized to become a secure courier by the marketplace, the guest 105 will establish a temporary connection with the host 110. Then, the guest 105 will send the data/information to the host 110 for delivery. The broker 150 will inform the host where, when and how to send the secure data. If the host 110 completes the delivery successfully, the broker 150 will record the transaction. Using interfaces 155 to applications, the broker 150 can then manage the appropriate value of the transaction and complete the transaction. If the host 110 fails to deliver the data, the data will become obsolete, and the broker 150 will inform the guest 105 to repeat the process.

Embodiments under the present disclosure can allow users to communicate with, or track, various types of devices. Furthermore, a user can do this while staying within a predetermined budget. For example, a user may want to track or communicate with machines such as parking meters, vending machines, coffee makers, refrigerators, lawn mowers, and others. Transmitted data can include device health, location, usage statistics, and more. The devices can be implemented with any type of short range connectivity that can connect to host devices. The broker of the system can weigh various factors including: how much data a first user desires to use, how much data a second user desires to give away, how much a first user is willing to pay, and how much and what form of compensation a second user desires.

Communication between host device 110 and guest device 105 can be bidirectional. A host device 110 may serve as a conduit for guest device 105 to report data to remote servers 160. In addition, remote servers 160 may desire to send a software update, or other information to guest device 105.

Application interface 155 an allow third parties to interface with the broker 150. For example, compensation to a host for their data can include points within a game managed by a third party. In such embodiments, in exchange for giving away wireless data, a user of a host device could receive extra lives within a video game, or extra points, or some form of benefit within an online game, video game, or online community. In another embodiment, a host's compensation could include reward points to a store, airline, or other third party. Application interface 155 would allow for the tracking and granting of such alternative forms of compensation.

Figure 2:
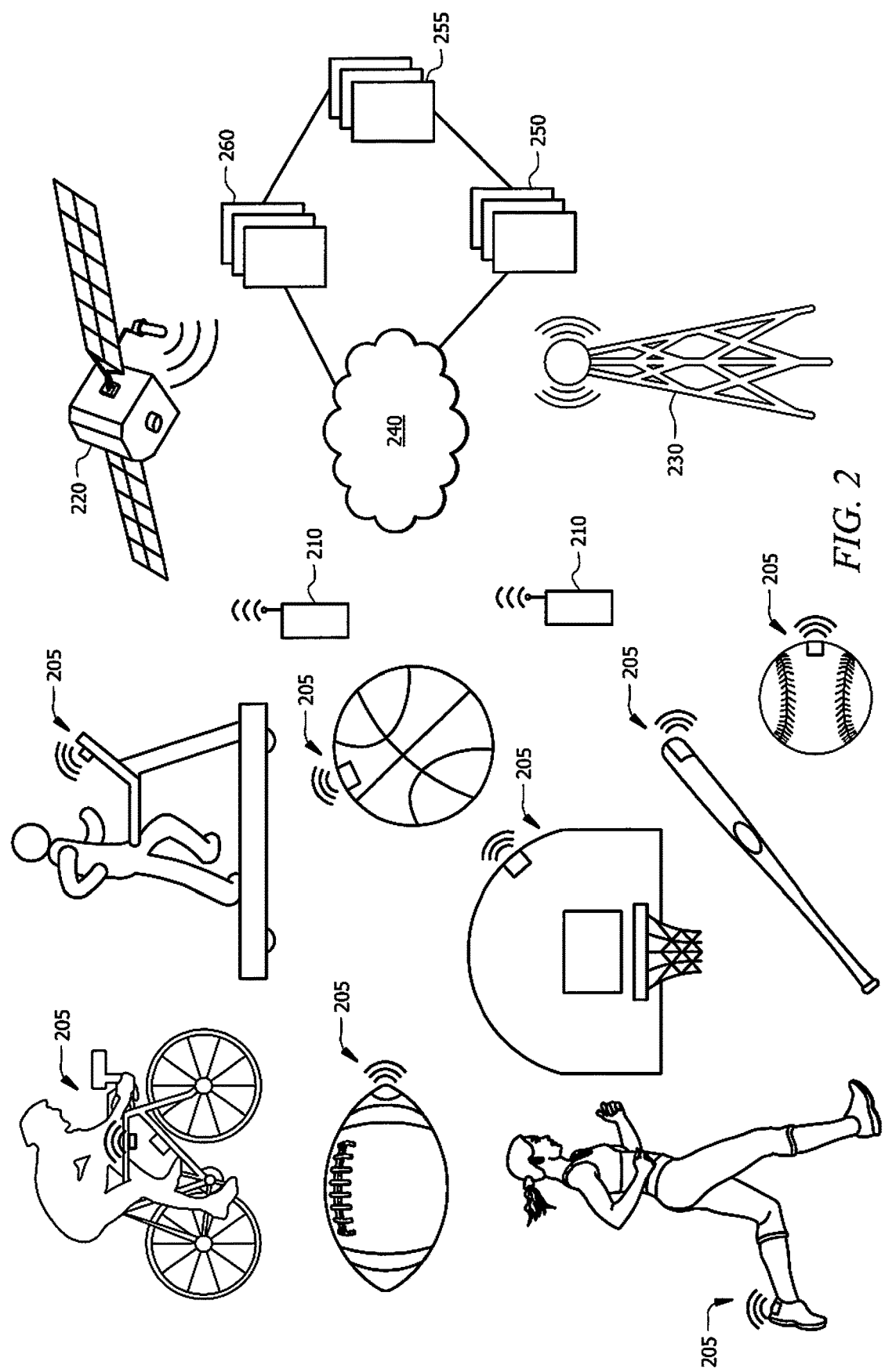
FIG. 2 is a diagram of one possible embodiment of the disclosure.

One possible embodiment under the present disclosure comprises a system 200, shown in FIG. 2, for monitoring sporting goods. In this embodiment, a variety of sports goods can comprise a short range wireless transmitter (or guest) 205. Examples of sports goods or equipment can include shoes (running, basketball, cross training, other), baseball bat, baseball, basketball, football, basketball goal, bicycle, treadmill, and others. Host devices 210 can be devices with long range wireless capability (such as cellular 230 or satellite 220). Host devices 210 can comprise a person's smartphone or tablet or other mobile device. Host devices 210 can also comprise wireless transmitters integrated into a car, motorcycle, bus, train, plane or other apparatus. Guests 205 can comprise data storage, power supply, GPS, accelerometer, thermometer, microprocessor, and other components. Guests 205 can also comprise other types of sensors for measuring or tracking whatever data a user desires. Examples of data can include: miles run in running shoes, spin on a ball, distance traveled on a bicycle, speed, force, and others. Data servers 260 may want to track and catalogue data from guests 205. To save money by avoiding a monthly data plan, or to only receive data on a sporadic schedule, guests 205 may connect to host devices 210 in order to send data to data servers 260. Broker 250 can manage the time or data limits that each host device 210 imposes on its use. Broker 250 can also manage the manner in which guests 205 and host devices 210 connect and communicate. Application interface 255 can provide a manner for data servers 260 to interact with broker 250. Broker 250 can store information about each host device 210, such as the amount of data that host device 210 is willing to sell from its wireless data plan, times of the day when host device 210 will sell data, time caps, minimum price to sell at, schedules setting different prices for different times of day or days during the week or year, and others. Broker 250 can also store data regarding each guest device 205, such as data amount requests, requested schedules or times, and other factors. Broker 250 may also track the locations of some or all of guests 205 and host devices 210. As a host devices 210 passes nearby any given guest 205, the guest 205 can determine that the host devices 210 is nearby by detecting a wireless signal, such as Bluetooth or Wi-Fi signals. Broker 250 may also wake up guests 205 or host devices 210 based on their location or because of a set schedule. Broker 250 may manage a "marketplace" for wireless data. The marketplace allows anyone with a data plan to become a host and enable data connectivity in exchange for points, rewards, money, or other compensation.

Figure 3:
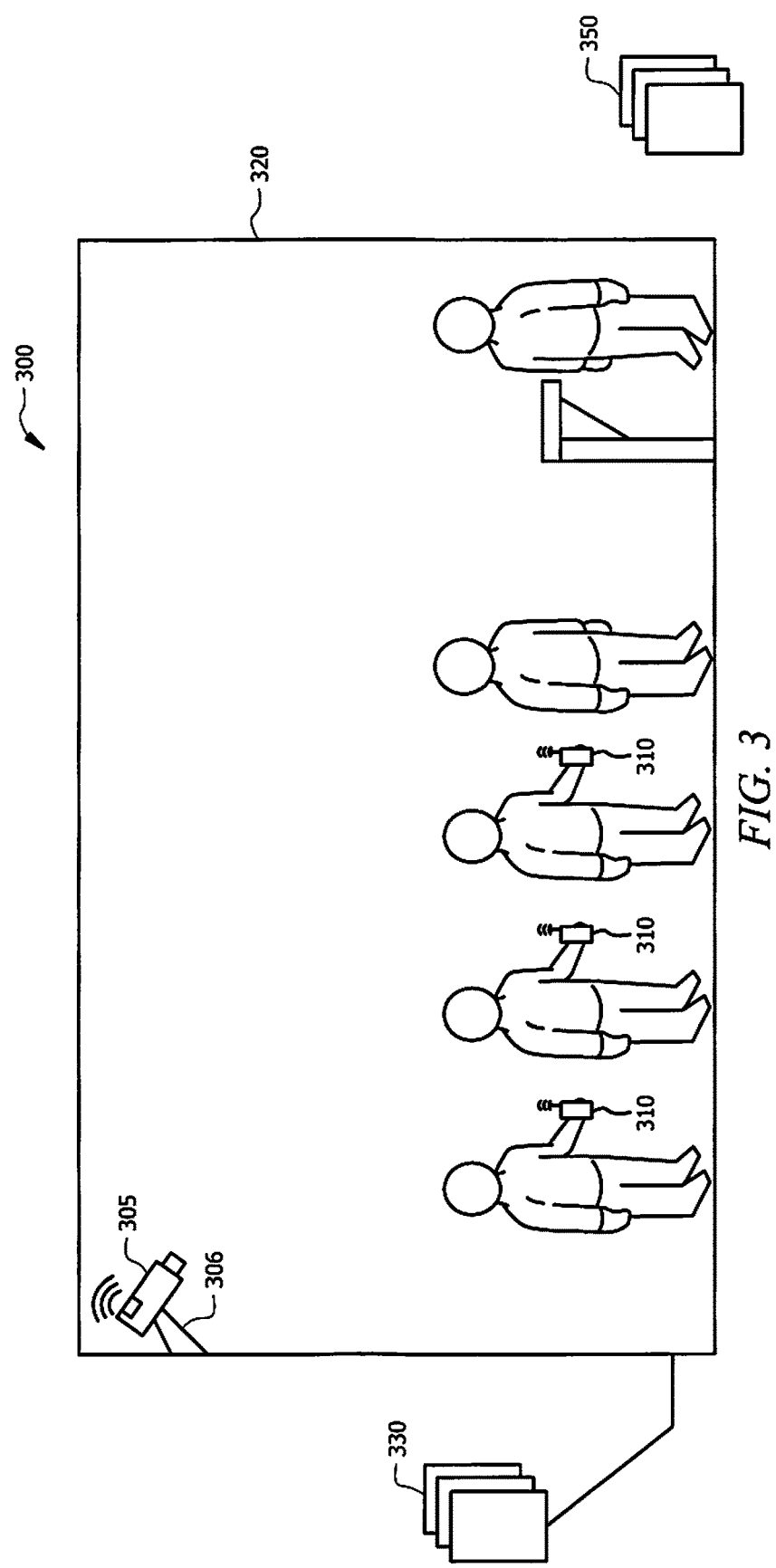
FIG. 3 is a diagram of one possible embodiment of the disclosure.

A further embodiment can comprise systems and methods for providing a backup wireless connection when a first data network is unavailable. One such embodiment can be seen in system 300 of FIG. 3. System 300 comprises a store, office, or other location 320. Implemented at location 320 is a security camera 305 with one or more communication interfaces. Security camera 305 can comprise a Bluetooth interface, a Wi-Fi interface, a cellular interface, and a hardline 306 interface. Host devices 310 can be user mobile devices such as smartphones. The users may be shopping at a store, going to the library, or engaging in some other activity. Security camera 305 may transmit video to servers 330 (which may be local or remote) via hardline 306, or via one or more wireless interfaces. There may occur some kind of connection problem preventing security camera 305 from transmitting data to servers 330. To give one example, the hardline 306 may be cut. To give another example, if security camera was using Wi-Fi to send data to servers 330, then the internet service provider may suffer an outage. However a disconnection happens, upon the disconnection the security camera 305 may act as a guest device and be able to send data via a host device 310. To give one example, security camera 305 may send out Bluetooth signals seeking a host 310. The means by which two devices communicate and connect in a secure fashion may be set by broker 350. There may be a special code that guests and hosts emit so that they can recognize each other. Or there may be a signal sent out on a predetermined wavelength. Sending of such codes or signals can be done on Bluetooth, Wi-Fi, or another wireless network or wireless standard. The disclosure of FIG. 3 could be applied to a variety of situations. Examples could include street cameras, street light cameras, dash cameras, fluid level sensors, store signs and billboards, pressure sensors, and other types of sensors or monitoring devices.

Figure 4:
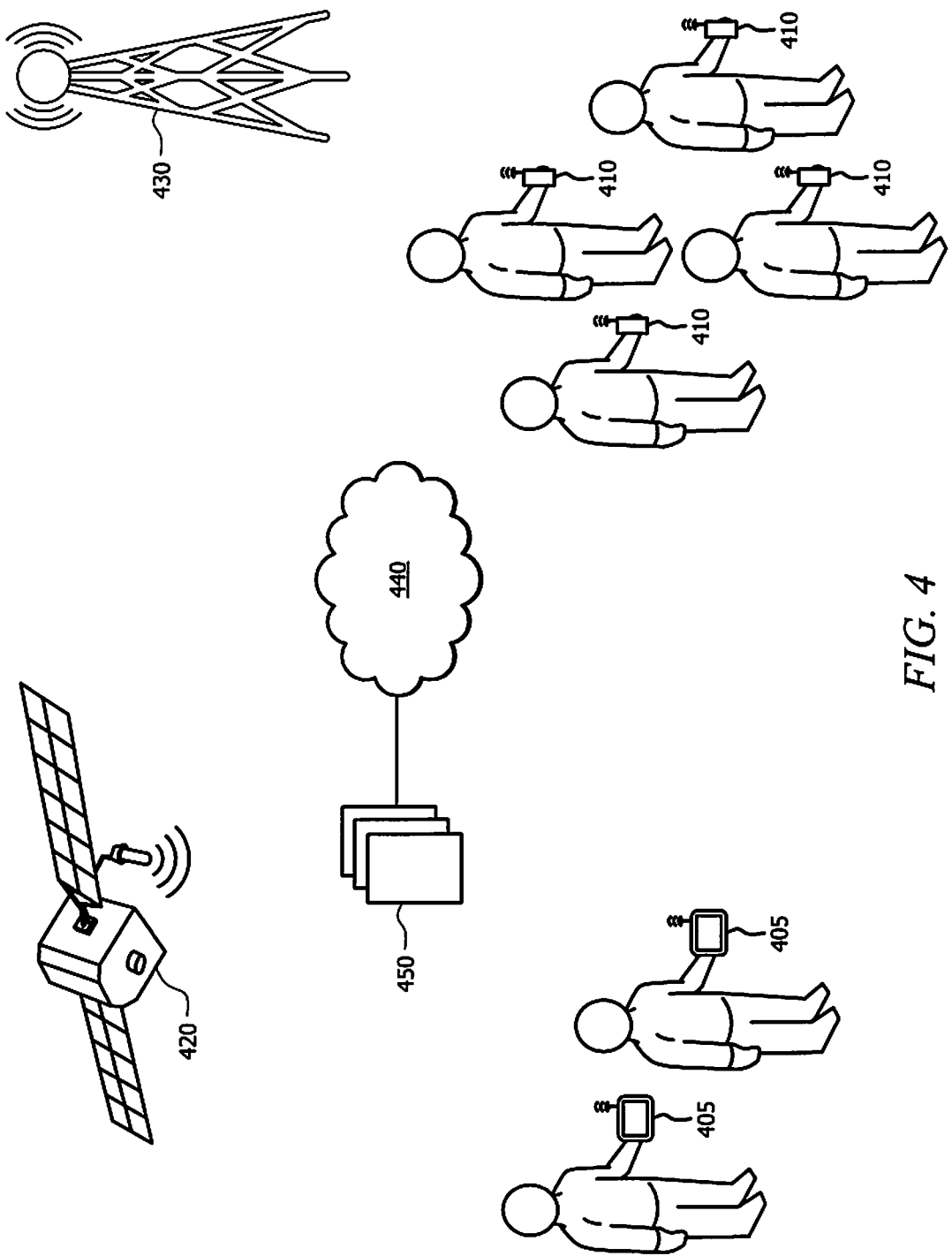
FIG. 4 is a diagram of one possible embodiment of the disclosure.

A further embodiment can involve methods and systems for avoiding high international roaming charges. As shown in FIG. 4, users of guest devices 405 may be traveling internationally. These travelers may be using smartphones and tablets in the destination country. International roaming charges can be high and the travelers would like to minimize their roaming charges. A cheaper alternative may be to pay host devices 410 for some of their wireless data. In this way guest devices 405 may connect to host devices 410, possibly over Bluetooth, and thereby connect to the internet 440. Broker 450 can arrange the pricing, payment, and security when guest devices 405 are connecting to host devices 410.

A further example of an embodiment under the present disclosure can comprise systems and methods for giving awards/points for users who provide wireless access as a host device. For example, a vending machine may need to send a daily update to a manager but has not reported in the past 24 hours. It really needs someone to walk by it so it can report its status. In fact, it is willing to award double points if someone can get there in one hour. The marketplace (broker) can inform registered hosts in the vicinity about this incentive.

Embodiments under the present disclosure can include hard wired connections. In various embodiments under the present disclosure, a company or individual with a fixed (wired) broadband connection can make access to that connection available through the marketplace to people passing by the fixed location. The passersby could access the broadband connection wirelessly or hard-wired. Also, the broker can access software on the host hard wire connection, or a guest device, so that the device is automatically enabled to register on the marketplace and provide the benefits of cost effective connectivity.

Figure 5:
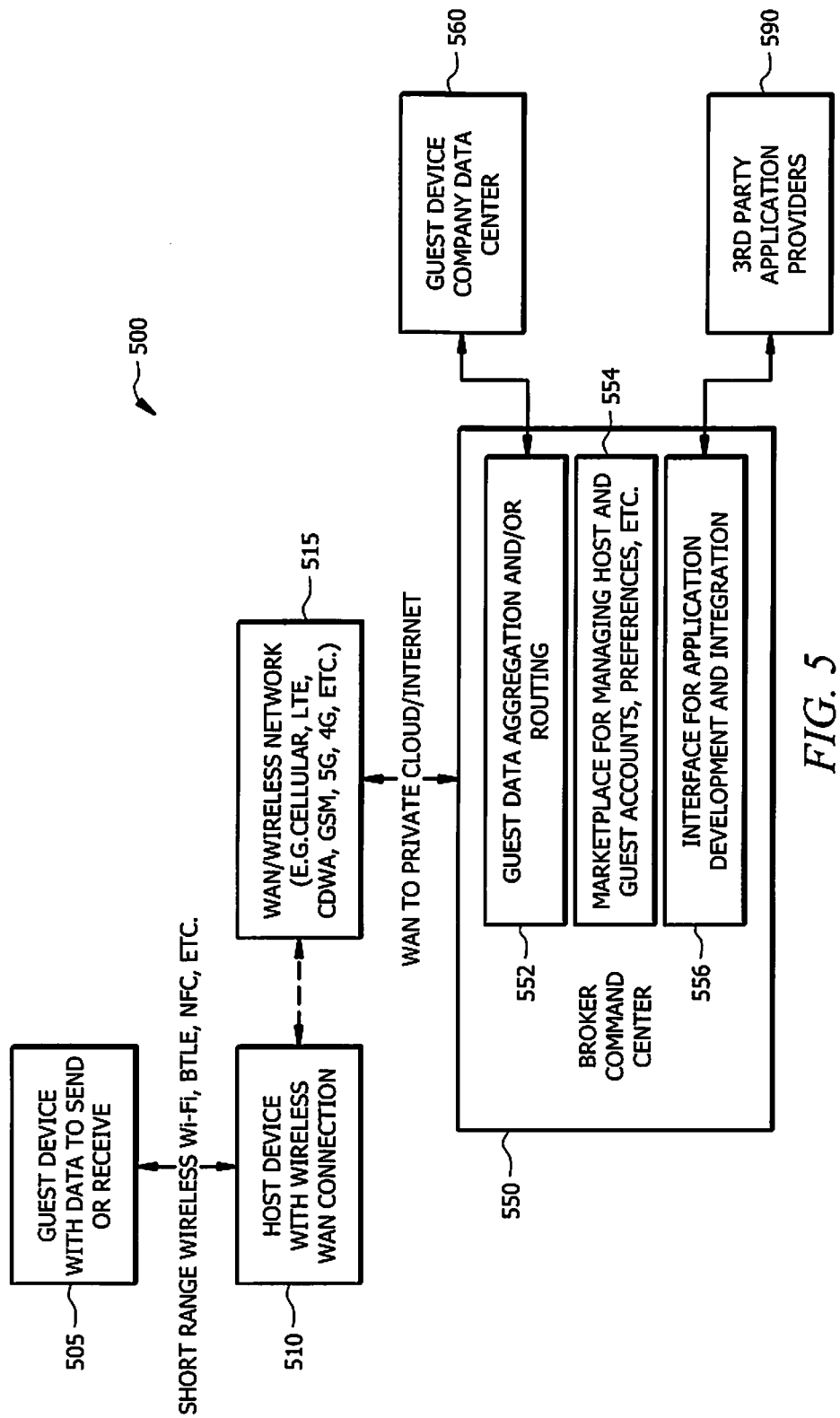
FIG. 5 is a diagram of one possible embodiment of the disclosure.

FIG. 5 displays a possible embodiment under the present disclosure of a schematic flow chart 500. Guest 505 can be any type of device in need of sending data. Host 510 can be any type of device with a surplus of wireless (or wired) data to share or sell. Guest 505 and host 510 can connect by any appropriate short range wireless network or standard, such as Wi-Fi, Bluetooth, NFC, or others. Host 510 can then connect, and transmit the data of guest 505, over a longer range network, such as a cellular network, 5G, 4G, LTE, CDMA, or others. Data communicated from host 510 can go to broker 550, which can assist in managing the data sent, pricing, scheduling, and other tasks. Broker 550 can comprise a guest data server 552, a marketplace 554, and an application interface 556. These elements can comprise separate servers or virtual portions of a single server, or set of servers. Guest data server 552 can forward data from guest 505 to a data center 560 of the owner of guest 505. Application interface 556 can connect to third party application providers 590. Application providers 590 can include the owners of data centers 560 or other groups that develop applications that interface with the system 500 to assist or augment the functionality provided.

Figure 6:
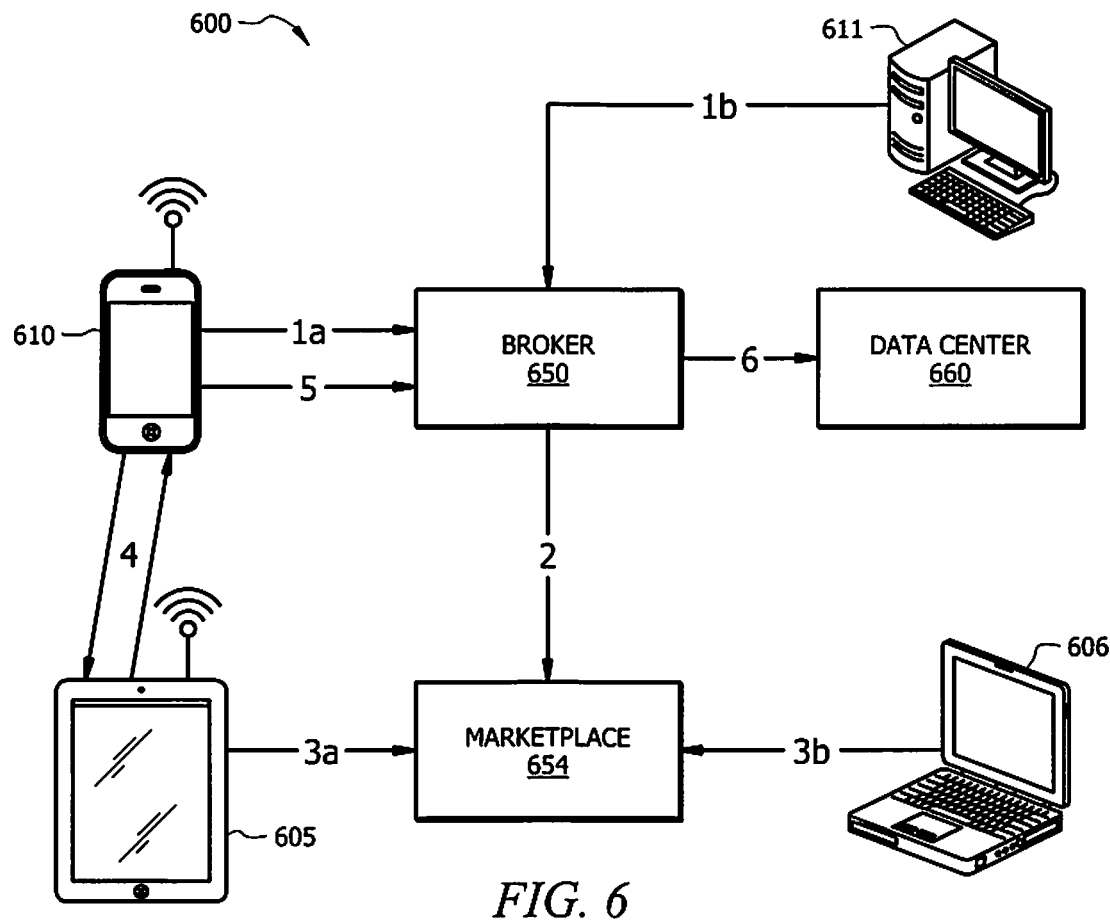
FIG. 6 is a diagram of one possible embodiment of the disclosure.

FIG. 6 displays a possible flow chart diagram illustrating an embodiment under the present disclosure. In this embodiment guest 605 desires to send data to data center 660. Host 610 may have surplus wireless data to sell. Host 610 (or a computer used by the owner of host 610) can communicate to broker 650 regarding the price, schedule, and availability of host 610 to be used as a host (steps 1a and 1b). Broker 650 can use this information, and information from other hosts, to create a marketplace 654 for the selling of wireless data (step 2). Step 2 may involve the broker 650 adding new information to an already existing marketplace 654. Marketplace 654 may be visible or invisible to users. Guest 605 may connect to marketplace 654 to bid for wireless data. A user of guest 605 may input a maximum price he is willing to pay for a gigabyte of data, for example (step 3a). If marketplace 654 finds a seller at the price (host 610 for example), then the host 610 and guest 605 can be matched. There may be a plurality of hosts that guest 605 is matched to, any of whom, when near guest 605, can receive data from guest 605 and serve as courier for that data. Because guest 605 may not be able to reach marketplace 654, a user of guest 605 may connect to the marketplace by another means, such as computer 606, or another mobile device (step 3b). Once marketplace 654 has approved, or matched, guest 605 and host 610, then guest 605 can transmit data to host 650 (at step 4). Host 610 can then transmit this data to broker 650 (step 5) and then onto data center 660 (step 6). In some embodiments the host 610 may communicate directly to data center 660.

Using blocks of time, data sizes, and prices as an example only, broker 650 may make data with a pre-approved group of hosts 610 available to guests 605 on marketplace 654. Data can be sold in 1 megabyte, 1 gigabyte, or other size increments. Data could also be sold in time increments (10 minutes, 2 hours, etc.). The price can be programmed to drop by $1/hr for each hour committed to by a guest 605 down to a minimum price. While time, data, and price have been used in the example, other criteria or requirements may be used by hosts 610 or broker 650 when making a sale without departing from the scope of the concepts described herein. For example, a host may only want to accept connections from certain types of devices. One operating system may be preferred over another, for example.

Figure 7:
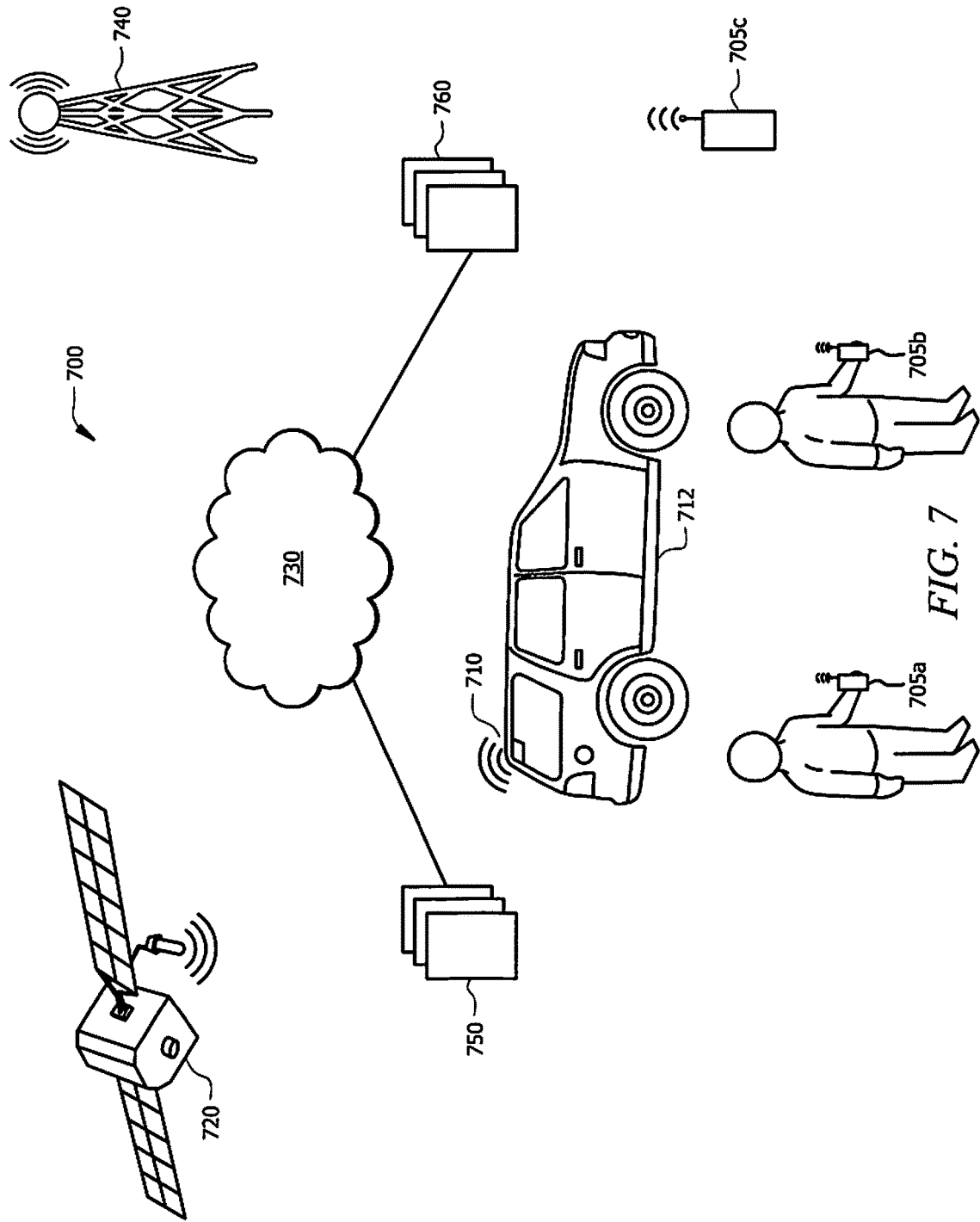
FIG. 7 is a diagram of one possible embodiment of the disclosure.

A further embodiment under the present disclosure can comprise a car 712 with an integrated host 710, such as in system 700 of FIG. 7. Many cars in the future will have cellular radios, or other types of wireless communication. This wireless capability can be used for infotainment, telematics for manufacturers, service centers and drivers, traffic, routing and safety tools, and for autonomous vehicles that wish to communicate with other vehicles or infrastructure. As shown in FIG. 7, car 712, with host 710, can assist in providing wireless capability to guest devices 705a-c. Guest devices can comprise user's mobile devices such as guests 705a-b. Guest devices can also comprise guest device 705c, which may be integrated into any of a variety of objects, such as parking meters, street cameras, and more. Host device 710 may connect any appropriate wireless network, such as cellular 740, satellite 720. Internet 730 can provide connections between these networks and to broker 750, or data center 760. Guest devices 705a-c may even send requests to broker 750, or car 712, to have the host device 710 brought near their location. There could be an incentive for owners of cars 712, such as parking spaces, free infotainment content, free battery charging, etc. If a car 712 loses its long range wireless network, it could share the connectivity of vehicles around it for safety or emergency type information.

Figure 8:
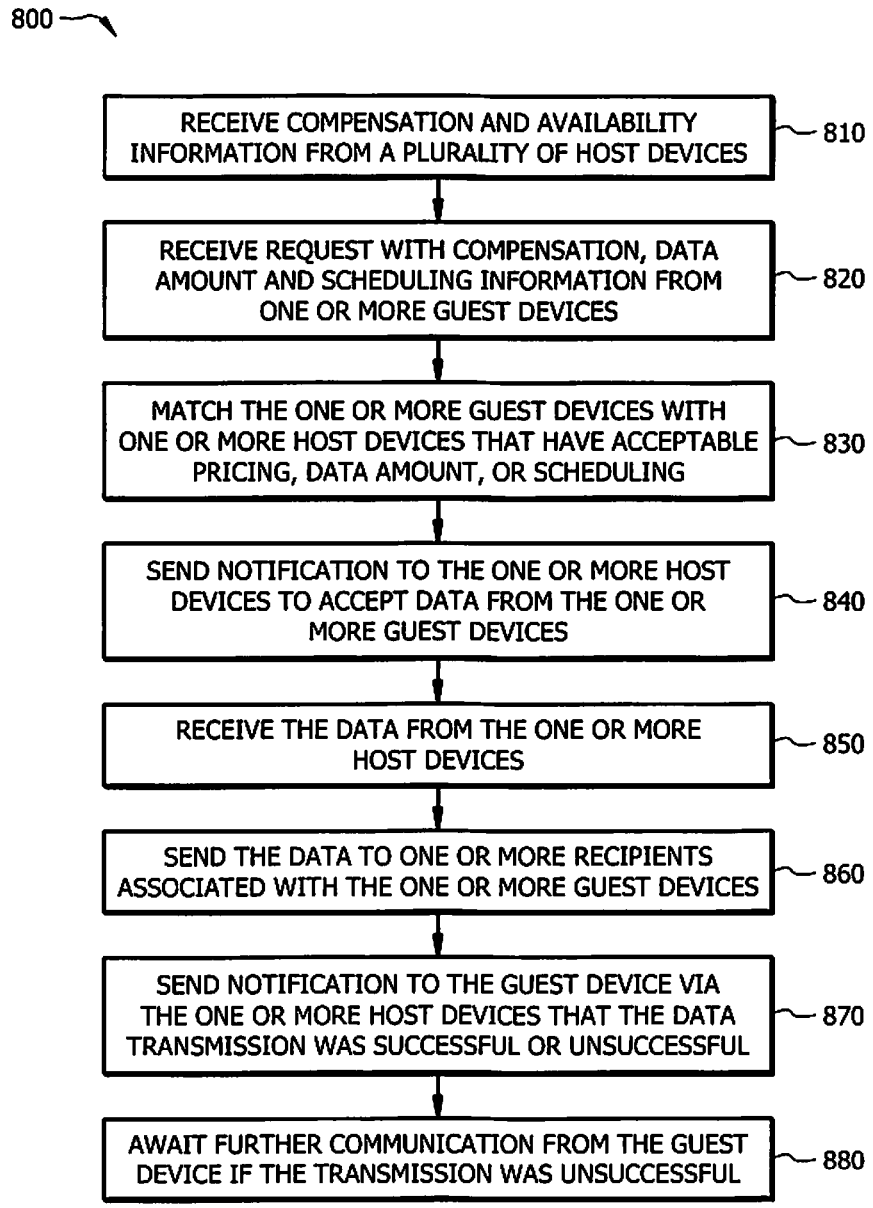
FIG. 8 is a flow chart diagram of one possible embodiment of the disclosure.

FIG. 8 displays a possible method embodiment 800 under the present disclosure. At 810, compensation, data amount, and availability information is received from a plurality of host devices. At 820, requests with compensation, data amount, and scheduling information are received from one or more guest devices. At 830, the one or more guest devices are matched with one or more host devices based on price, data amount, and availability. At 840, notification is sent to the one or more host devices to accept data from the one or more guest devices. At 850, the data is received from the one or more host devices. At 860, the data is sent to one or more recipients associated with the one or more guest devices. At 870, a notification is sent to the guest device indicating if the data transmission was successful or unsuccessful. If the transmission is unsuccessful, then at 880, further communication may be received from the guest device.

Figure 9:
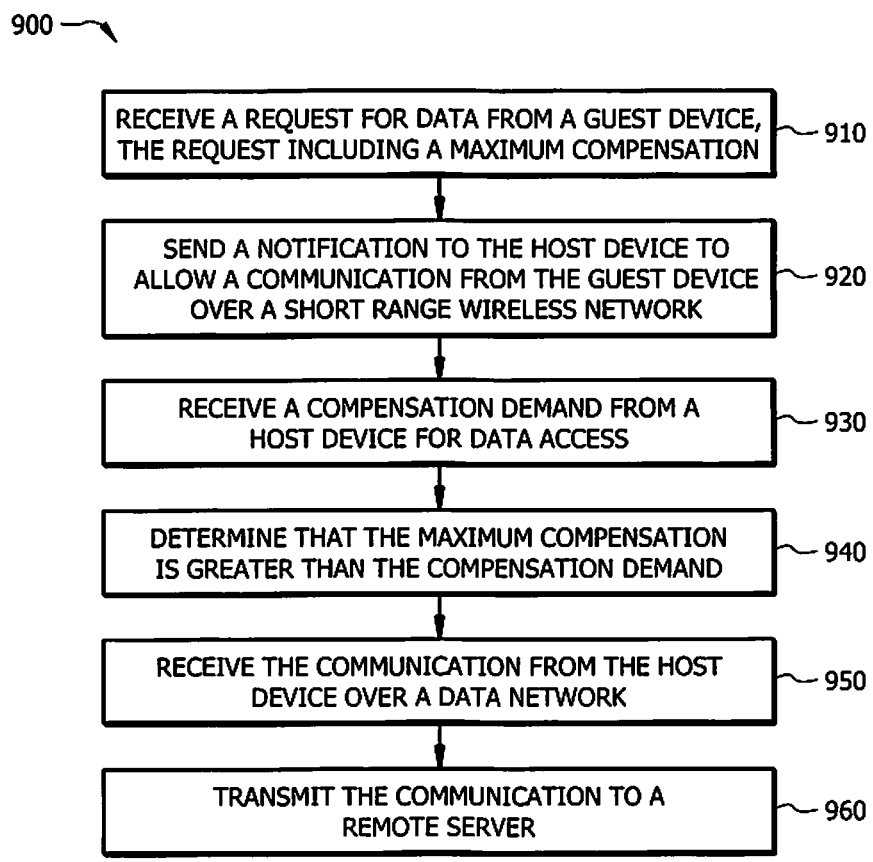
FIG. 9 is a flow chart diagram of one possible embodiment of the disclosure.
Figure 10:
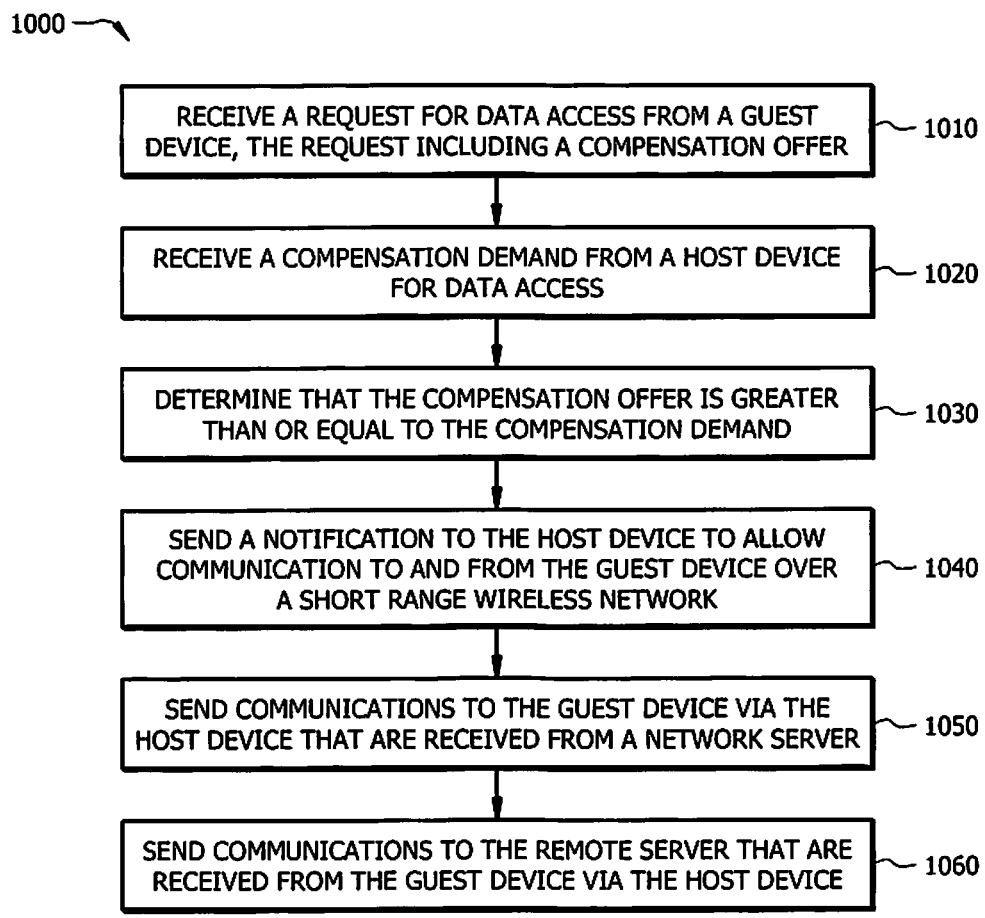
FIG. 10 is a flow chart diagram of one possible embodiment of the disclosure.

Another possible method embodiment 900 is shown in FIG. 9. At 910, a request for wireless data access is received from the remote device, the request including a maximum price. A price demand for wireless data access can be received from a host device, at 920. It can then be determined that the maximum price is greater than the price demand, 930. At 940, a notification is sent to the host device commanding it to allow a communication from the remote device over a short range wireless network. At 950, the communication can be received from the host device over a data network. Next, the communication is sent to the remote server, 960.

Another possible method embodiment 1000 is shown in FIG. 9. At 1010, a request for data access is received from the guest device, the request including a compensation offer. A compensation demand for data access can be received from a host device, at 1020. It can then be determined that the compensation offer is greater than or equal to the compensation demand, 1030. At 1040, a notification is sent to the host device commanding it to allow communications to and from the guest device over a short range wireless network. At 1050, communications can be sent to the guest device via the host device that are received from a remote server. At 1060, communications can be sent to the remote server that are received from the guest device via the host device.

In preferred embodiments under the present disclosure the data exchanged between the host and guest is secure and "anonymous". The host can serve as a courier and has no view of the actual content of the data being communicated by a guest device using the host. In addition, data can be removed from the host upon successful delivery confirmation or delivery failure. The broker can administer the rules and parameters for successful data delivery. Host identification and information can be anonymized as well. For example, company collecting data from a guest device may not know which host devices are acting as courier for the data. Certain companies/users may restrict what types of devices are eligible to serve as hosts for their data, but they would not know further information.

Certain embodiments of the present disclosure may not include a compensation or remuneration by a guest to a host. Such embodiments may be useful in enterprise-based embodiments. For example, a company may deploy a solution across employee mobile devices, whereby the employee mobile devices serve as hosts for company assets, such as other mobile devices, parking meters, sensors, and other devices. In such embodiments, a company may desire to track the identify of host devices. The company may be able to manage their own broker and therefore track and record the identities of hosts, and track the data sent across each host. Similar embodiments can be achieved with a centralized broker as well.

Embodiments under the current disclosure can comprise methods and systems for providing data to hard to reach locations, or for incenting host devices to go to certain locations to service a given population of guest devices. In such embodiments, the broker and/or marketplace server can set higher compensation awards for users of host devices if they go to certain predetermined locations. This can be in addition to, or in place of, compensation offered by the targeted guest devices at the predetermined location. The market for incenting host devices (such as smartphones, vehicles, autonomous vehicles, drones, or others) to go to certain locations can be a secondary market separate from the market for wireless data generally. Broker servers as described in the present disclosure may comprise separate marketplace servers for the wireless data market and for the secondary market for predetermined locations. The server for such a secondary market can comprise a matchmaking service or server.

Certain embodiments under the present disclosure create a trusted relationship for any host that is enabled on the marketplace as a secure courier of data. Hence, any guest device that needs to transmit data to the internet may form a temporary connection(s) with host device(s), thereby eliminating the need for dedicated wireless data plans. It should be understood, of course, that the foregoing relates to exemplary embodiments of the present disclosure and that modifications may be made without departing from the spirit and scope of the invention as set forth in the following claims.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for connecting a remote device to a remote server, comprising:
   receiving, from the remote device, a request for data access, the request including a maximum compensation offer;
   receiving, from a host device, a compensation demand for data access;
   determining that the maximum compensation offer is greater than or equal to the compensation demand;
   sending a notification to the host device to allow a communication from the remote device over a short range wireless network;

receiving the communication from the host device over a data network;

transmitting the communication to the remote server; and receiving a compensation credit from an application interface, the compensation credit comprising a form of compensation for use in a third party application.

2. The method of claim 1 wherein the host device is a vehicle or a smartphone.

3. The method of claim 1 wherein the remote device is a security camera.

4. The method of claim 1 wherein the host device is a Wi-Fi router and the data network comprises a hardline connection to the Wi-Fi router.

5. The method of claim 1 wherein the data network is wireless.

6. The method of claim 1 wherein the short range wireless network is Bluetooth.

7. The method of claim 1 wherein the short range wireless network is 802.11.

8. A system for connecting a remote device to a remote server, comprising:

a first communication interface operable to receive a request for wireless data access from the remote device, the request including a maximum compensation offer, the first communication interface further operable to receive a compensation demand for wireless data access from a host device;

a server operable to determine that the maximum compensation offer is greater than or equal to the compensation demand, the server operable to send a notification to the host device to allow a communication from the remote device over a short range wireless network, the server further operable to receive the communication from the host device over a data network;

a second communication interface operable to transmit the communication to the remote server; and an application interface operable to receive a compensation credit from a third party application server, the compensation credit comprising a form of compensation for use in a third party application.

9. The system of claim 8 wherein the host device is an autonomous vehicle.

10. The system of claim 8 wherein the remote device is a security camera.

11. The system of claim 8 wherein the remote device is a parking meter.

12. The system of claim 8 wherein the remote device is a smartphone.

13. The system of claim 8 wherein the short range wireless network is Bluetooth.

14. The system of claim 8 wherein the short range wireless network is 802.11.

15. A system for connecting a remote device to a remote server, comprising:

a host device operable to communicate over a short range wireless network and a long range wireless network;

a marketplace server operable to receive a request for wireless data access from the remote device, the request including a maximum compensation offer, the marketplace server further operable to receive a compensation demand for wireless data access from the host device, the marketplace server further operable to determine that the maximum compensation offer is greater than or equal to the compensation demand, the marketplace server operable to send a notification to the host device to allow a communication from the remote device over the short range wireless network;

a data server operable to receive the communication from the host device over the long range wireless network and to transmit the communication to the remote server; and a matchmaking server, the matchmaking server operable to incept host devices to travel to a predetermined location.

16. The system of claim 15 further comprising an application interface, the application interface operable to communicate with a third party application server.

17. The system of claim 15 wherein the remote device is a security camera.

* * * * *